Patented Oct. 31, 1933

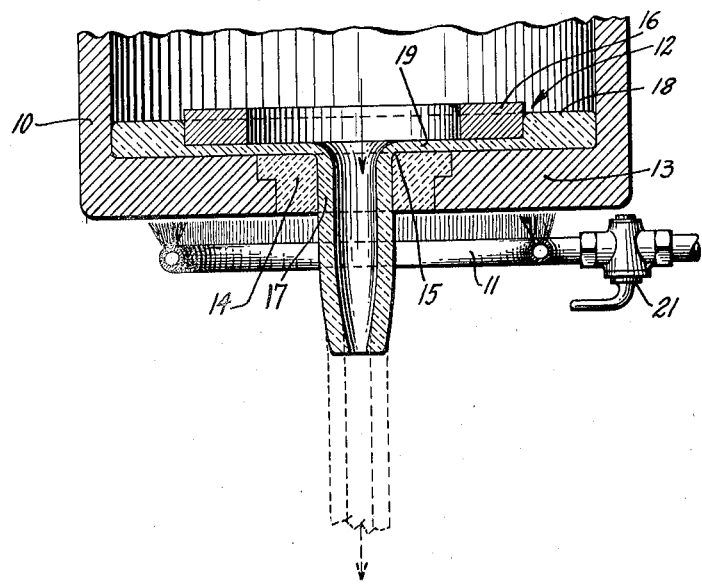

1,933,341

UNITED STATES PATENT OFFICE 1,933,341

APPARATUS FOR MAKING GLASS TUBING

Henry K. Richardson, Bloomfield, N. J., assignor to Westinghouse Lamp Company, a corporation of Pennsylvania Application January 2, 1930. Serial No. 417,915

4 Claims. (Cl. 49—17.1)

This invention relates to the manufacture of glass tubing and relates more particularly to an apparatus for the continuous formation of tubing from flowing material.

Heretofore glass tubing has been produced by various methods as for example by the use of a hollow rotating mandrel from which the tubing was drawn or by the use of a bait which was inserted into a molten quantity of glass and around which a wall of glass was drawn to produce a tube. Other methods have been employed in which the operation of tube making included a drawing of the plastic vitreous material and it had heretofore been necessary to employ either extremely skilled labor or to utilize a considerable amount of apparatus, all of which tended to increase the cost of production and involved various difficulties from the human element standpoint.

It is an object of the present invention therefore to provide a simple and effective apparatus for the continuous formation of a glass tubular body.

Another object of the invention is to provide an apparatus for forming tubing by a continuous controlled flow of mobile material.

Another object of the invention is to provide an apparatus for causing a continuous flowing cylindrical wall of mobile material.

Another object of the invention is to provide means for guiding a cylindrical wall of flowing mobile material over the surface of an aperture.

Other objects and advantages of the invention will be more fully understood by the following description together with the accompanying drawing, which shows a vertical cross sectional view of a glass pot or container having an aperture for the outlet of controlled flowing material construction in accordance with the present invention.

The present invention is fundamentally directed to the idea of forming glass tubing by permitting flowing glass to pass by gravity through an aperture and in maintaining the flow so as to avoid filling the aperture and thus produce a continuous travelling tubular wall conforming to the shape of the outlet aperture and resulting in the formation of a tube of indefinite length.

In accomplishing the above a container or glass pot 10 may be provided with suitable heating elements 11 and containing a quantity of molten material 12. In a bottom wall 13 of the container may be provided a refractory insert 14 in the form of an annulus to provide an aperture 15, the insert 14 which may be termed an orifice ring is arranged flush with the surface of the bottom wall 13 so that glass or other material 12, when in a mobile or liquid state, will normally flow by gravity through the aperture 15. It has also been found that instead of having the insert 14 flush with the surface of the bottom wall 13 a raised annulus or barrier may be provided to slightly retard the flow of material over the edge of the aperture 15.

Under ordinary conditions the glass would pass through the aperture 15 and entirely fill the same. It has been found, however, that by providing what may be termed a float ring 16 the outwardly flowing glass may be controlled so that instead of filling the aperture the flowing glass will travel over the edge of the orifice ring in a layer or wall 17 thus as the material travels outwardly through the opening it will take the form of a tube and assume a definite diameter.

The tubular glass body issuing from the orifice ring may be permitted to travel a sufficient distance until a given length has cooled and suitable cutting mechanism (not shown) may be employed to cut off sections of the formed hardened tube. As will be noted the float ring 16 is of circular form and of sufficient weight to act as a dam and retard the flow of the material 12 so that the major portion 18 of the material constitutes a source of supply for the flow of a thin layer or film 19 which passes under the float ring and over the edge of the orifice ring.

It will be understood that the thickness of the film 19 is dependent upon the weight or position of the float ring 16 with respect to the bottom wall 13 of the container and to the density or plasticity of the material 12. The float ring may be adjusted either by mechanical means or by reason of its weight to a definite position and the heater element 11 which in the present case may consist of a set of gas fires, may be controlled by a valve 21 to vary the temperature of the glass and thus vary its mobility. As above mentioned the glass may flow from the orifice ring and be cut in sections, it being understood, however, that the diameter of the cut sections may be determined by the distance the material is permitted to flow or the rate of flow from the bottom of the container.

It is to be understood that if desirable air under pressure may be employed when forming tubing in the manner disclosed in the drawing in order to more definitely control the wall thickness of the resilient tubing. Furthermore it will be evident that although the glass will flow, the action may be speeded up by securing the hardened or partially hardened portion of the forming tube and drawing the same away from the outlet orifice.

The present invention provides a simple and effective method for the continuous production of glass tubing at relatively low cost and with a minimum amount of skilled attention as compared with methods heretofore proposed.

Although a preferred embodiment of the invention is described herein it will be understood that modifications may be made therein without departing from the spirit and scope of the invention as set forth in the appended claims.

What is claimed is:

1. An apparatus for making glass tubing comprising a tank having a gravity outlet passage, a batch of glass in said tank, means for maintaining glass in a fluid state in said tank for discharge through said passage and means supported by said glass for retarding the flow of glass toward said passage to cause a stream of glass to travel over the wall of the passage and issue therefrom in the form of a tube.

2. An apparatus for making glass tubing comprising a tank having a gravity outlet passage, means for maintaining a quantity of glass in a fluid state in said tank for discharge through said passage, an annulus supported by said glass surrounding the orifice of said passage to retard the flow of glass toward said orifice and cause a relatively thin layer of glass to travel over the wall of said passage and issue therefrom in the form of a tube.

3. An apparatus for making glass tubing comprising a tank having a gravity outlet passage, means for maintaining a quantity of glass in a fluid state in said tank for discharge through said passage, an annulus supported by said glass surrounding the orifice of said passage to retard the flow of glass toward said orifice and cause a relatively thin layer of glass to travel over the wall of said passage and issue therefrom in the form of a tube, said annulus being replaceable by one of greater or lesser weight to vary the thickness of said layer.

4. An apparatus for making glass tubing comprising a tank having a gravity outlet passage, means for maintaining a quantity of glass in fluid state in said tank for discharge through said passage, a ring surrounding said outlet passage supported by said glass to retard the flow of said glass toward the orifice of said passage to cause a relatively shallow stream of glass to flow through said passage in the form of a tube and means for varying the fluidity of said glass.

HENRY K. RICHARDSON.